United States Patent
Dillinger et al.

(10) Patent No.: US 7,369,517 B2
(45) Date of Patent: May 6, 2008

(54) METHOD FOR DOWNLOADING DATA IN A RADIO COMMUNICATIONS SYSTEM

(75) Inventors: Markus Dillinger, München (DE); Jijun Luo, München (DE); Eiman Bushra Mohyeldin, München (DE)

(73) Assignee: Siemens Aktiengesellschaft, Munich (DE)

( * ) Notice: Subject to any disclaimer, the term of this patent is extended or adjusted under 35 U.S.C. 154(b) by 465 days.

(21) Appl. No.: 10/504,000

(22) PCT Filed: Feb. 7, 2003

(86) PCT No.: PCT/EP03/01249

§ 371 (c)(1),
(2), (4) Date: Aug. 9, 2004

(87) PCT Pub. No.: WO03/067433

PCT Pub. Date: Aug. 14, 2003

(65) Prior Publication Data

US 2005/0083924 A1    Apr. 21, 2005

(30) Foreign Application Priority Data

Feb. 7, 2002    (EP) .................................. 02002786

(51) Int. Cl.
*H04B 7/216*    (2006.01)
*H04Q 7/00*    (2006.01)

(52) U.S. Cl. ..................... 370/310; 370/335; 370/343

(58) Field of Classification Search ........ 370/230–231, 370/312, 318, 278, 335, 342–343, 394–396, 370/236, 311

See application file for complete search history.

(56) References Cited

U.S. PATENT DOCUMENTS 5,689,825 A    11/1997    Averbuch et al.

(Continued)

FOREIGN PATENT DOCUMENTS

EP    0 959 635 A1    11/1999

(Continued)

OTHER PUBLICATIONS

Goff, T. et al.: "Freeze-TCP: A True End-to-End TCP Enhancement Mechanism for Mobile Environments", Electrical Engineering Department, State University of New York, Binghamton, NY, 9 pp.

(Continued)

*Primary Examiner*—Simon Nguyen
(74) *Attorney, Agent, or Firm*—Laurence A. Greenberg; Werner H. Stemer; Ralph E. Locher

(57) ABSTRACT

According to one aspect of the invention, in a radio communications system comprising at least one base station (BS1, BS2) provided with means for transmitting data via a communication link (BCCH; V), wherein the data is divided into a plurality of data packets and being transmitted via the communication link to at least one receiving station (UE). To reduce power consumption it is proposed that the downloading of the data packets is halted if it is determined that a data packet has not been received or a corrupted data packet has been received by the receiving station, the missing or corrupted data packet is retransmitted via the same or a different communication link at a later time.

13 Claims, 8 Drawing Sheets

U.S. PATENT DOCUMENTS

| | | |
|---|---|---|
| 6,023,664 A | 2/2000 | Bennet |
| 6,389,016 B1* | 5/2002 | Sabaa et al. ................ 370/389 |
| 6,907,005 B1* | 6/2005 | Dahlman et al. ........... 370/236 |
| 6,996,624 B1* | 2/2006 | LeCroy et al. .............. 709/231 |
| 7,149,190 B1* | 12/2006 | Li et al. ..................... 370/278 |
| 2002/0071407 A1* | 6/2002 | Koo et al. .................. 370/335 |
| 2002/0082020 A1* | 6/2002 | Lee et al. ................... 455/450 |
| 2002/0150040 A1* | 10/2002 | Tong et al. ................. 370/216 |
| 2003/0012128 A1* | 1/2003 | Miyoshi et al. ............ 370/208 |
| 2003/0123394 A1* | 7/2003 | Neale et al. ................ 370/235 |
| 2004/0073901 A1* | 4/2004 | Imamatsu ................... 717/170 |

FOREIGN PATENT DOCUMENTS

| | | |
|---|---|---|
| WO | 96/39787 | 12/1996 |
| WO | 98/23050 | 5/1998 |
| WO | 00/41917 | 7/2000 |

OTHER PUBLICATIONS

Pan, J. et al.: "TCP Performance and Its Improvement Over Wireless Links", IEEE, Dec. 1, 2000, pp. 62-66.

* cited by examiner

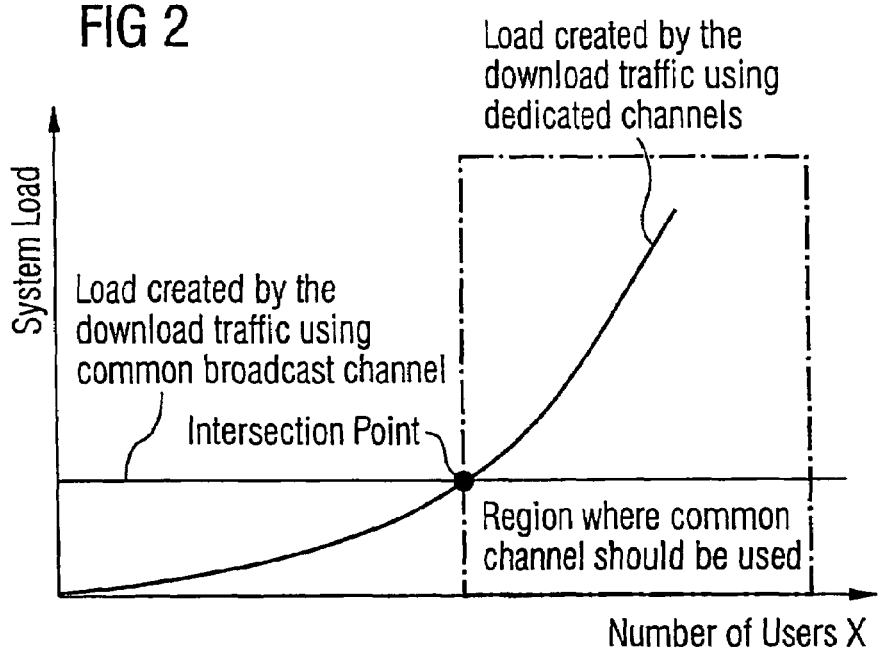
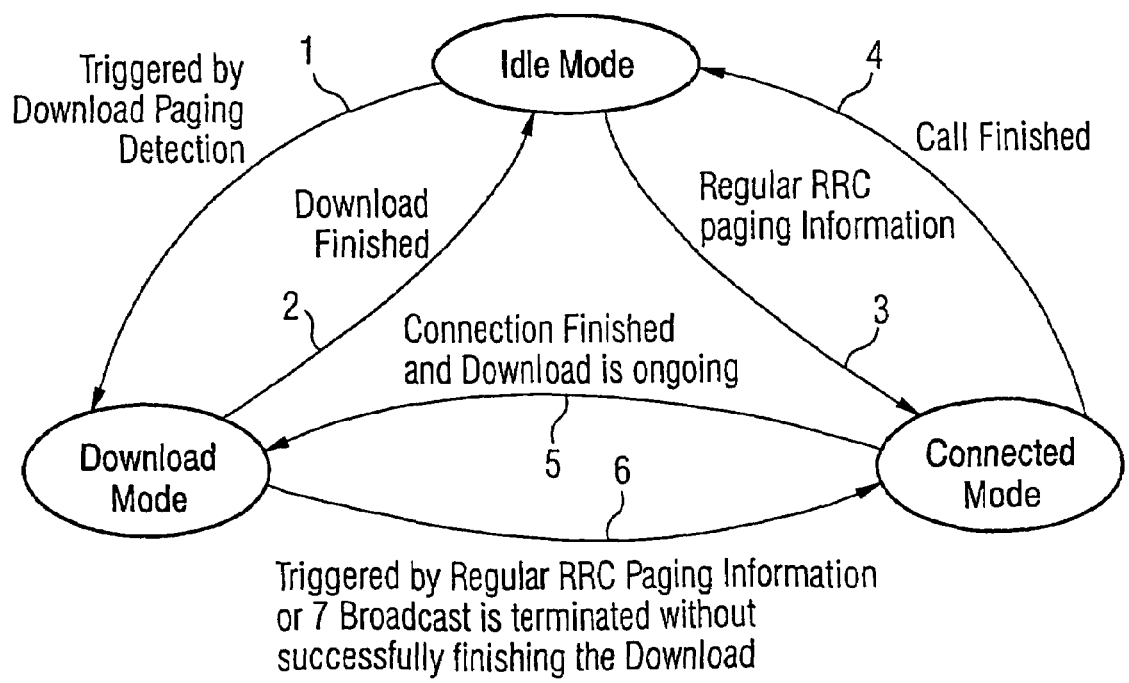

METHOD FOR DOWNLOADING DATA IN A RADIO COMMUNICATIONS SYSTEM

BACKGROUND OF THE INVENTION

Field of the Invention

This invention describes the management of downloads in a radio communications system, especially a method for downloading software data in a cellular network with broadcast or dedicated bearer services.

Radio communications systems transmit data or information, especially speech, picture information or other data via electro magnetic waves between a base station and a user equipment (mobile or terminal). Well known communications systems are mobile telecommunications systems like UMTS (Universal Mobile Telecommunication System) or wireless data networks like HiperLAN.

Within such communications systems data can be transmitted using on one hand one or more broadcasting channels for a point-to-multipoint communication link or on the other hand one or more dedicated channels of a point-to-point communication link. Information to be received by a plurality or all user equipments are transmitted by broadcasting this information in a broadcast channel. Information, which will be received by only one or some special user equipments is transmitted via point-to-point links. Furthermore, paging information can be sent to several user equipments via point-to-point links.

Telecommunication systems like UMTS are divided into a number of cells. Each cell comprises a base station communicating with user equipments within the cell via radio links. A radio link can be used for data transmission in downlink from a base station to user equipments and in uplink for data transmission from user equipments to the base station. It is also known to employ sector antennas at the base station to cover multiple cell sectors.

In contrast to point-to-point channels broadcast channels are not power controlled and therefore increase the interference in adjacent cells and cell sectors. If broadcast is used in all cells, an additional decrease of the overall cell capacity occurs due to intercell interference and cell coupling especially in CDMA (Code Division Multiplex Access) systems shich has a frequency reuse factor one. Cell coupling means that an increase of transmission power in one cell leads to an increase in transmission power of neighbouring cells due to the need to maintain the signal-to-interference relation for services. A specific download management for all involved cells in a geographic area must be applied when using cell broadcast in order to minimize the additional interference due to data download.

At present, the majority of wireless network user equipments work on a basis of software programs custom-designed for the appropriate operation of said equipments. These programs, however, frequently require modifications either in order to include new services that satisfy new user requirements, or to update the existing services incorporating more recent and improved versions of the existing software.

Due to rapid development of new program versions in the field of communications technology, frequent updates or modifications are required, which should be fast, reliable and cheap.

In order to update software data it is known to handover the user equipment to an operative area that performs the downloading operation of the new software by means of physical and individual contacts in each of them. This operation proves to be costly, inefficient as well as slow.

U.S. Pat. No. 5,689,825 discloses a method and a device for downloading an updated software program to portable wireless communication device without any intervention of the operator. A software program is updated in a portable communications device by means of a software downloader incorporated in the battery charger unit of said device. In this way, advantage is taken of the time dedicated to battery charging in order to carry out the downloading of updated software into the memory of the portable communications device. According to said method, a server receives the updated software via a wireless network and stores it for a later transmission to the portable device for which the update is intended. Said server provides the data of the updated software to a public land-based communications network which, internally, communicates by a cable connection with the software downloader mentioned. The software downloader, after receiving a series of priority messages, starts to receive the updated of software in the form of blocks from said public land-based communications network, stores that blocks, verifies if all the blocks have been received, and once reception has been concluded, forwards the blocks to the portable device, thereby completing the downloading process.

This method, however, is only applicable under conditions where use can be made of a public land-based communications network. In addition, the downloading of the software from the server to the portable destination unit is done necessarily over cable. Furthermore, the method requires the use of a software downloading unit especially designed for this purpose. In addition, access to the server is achieved by means of making calls to said server, implying additional operating expenses.

EP 0 959 635 A1 discloses a method for connectionless downloading of a software program to a number of user equipments of a communications network by broadcasting the software program in a downloading channel of a base station. The program is thereby downloaded in fragmented form to a set of user equipments which ara grouped together according to their software version. The transmission takes place in repeated sequences. Each user equipment receives the repeated sequences of software program fragments, stores program fragments which it received error-free, and continues receiving repeated sequences until a complete version of error-free received fragments has been stored. Thereafter, the user equipment sends a confirmation to the network, indicating that the download is completed. After a percentage of user equipments having sent confirmations is equal to or greater than a threshold value, the downloading process is stopped. User equipments which did not receive the complete program, subsequently receive missing fragments by means of connection-oriented (point-to-point) procedures.

SUMMARY OF THE INVENTION

Problems in the aformentioned methods and systems arise when a user equipment leaves a cell in which the data is broadcasted before the completion of a download, as this situation is not covered. It is therefor one object of the present invention to provide a method enabling the completion of a download even in case of for example a handover.

The aforementioned problems are solved by features of the independent claims. Preferred embodiments of the invention are addressed in dependent claims.

According to a first aspect of the invention, downloading of data packets is halted if it is determined that either a data packet has not been received or that a corrupted data packet has been received by a receiving station. The missing or corrupted data packet is retransmitted via the same or a different communication link at a later time.

This procedure is advantageous because the receiving station, e.g. a user equipment complying for example with a UMTS, WLAN or HiperLAN standard, need not receive and correct download data when there is too much interference on the channel used for transmission, thereby reducing the power consumption of the station. As a side effect, because of the interruption the overall interference in the system is reduced.

According to a second aspect of the invention, the downloading of the data packets is halted if it is determined that a handover of the receiving station is due, and resumed once the handover is concluded and a new communication link established.

An advantage of this method is that the download can be resumed after a handover for example to another base station is concluded by using the new established link. In contrast to methods known in the art it is not necessary to subsequently receive data via a special interface. The new communication link used for receiving data packets can be a broadcast link or a dedicated link.

According to a third aspect of the invention, the downloading of the data packets in a broadcast channel is halted if it is determined that either a data packet has not been received or that a corrupted data packet has been received by the receiving station, and a dedicated channel is established for a retransmission of the missing or corrupted data packet.

By using a dedicated channel to conclude the download of data packets, the broadcast channel can be used for broadcasting data packets belonging to a different download or can just cease broadcasting thereby reducing interference. A further advantage of this aspect of the invention is that a dedicated channel is generally used for a point-to-point communication and therefore employs power control mechanism or even transmits only in a certain direction in order to limit interference.

BRIEF DESCRIPTION OF THE DRAWINGS

The invention is now described with reference to the following drawings:

FIG. 2 shows a diagram illustrating system load via number of users when transmitting signals via broadcasting channels and via dedicated channels, respectively.

FIG. 3 shows three user equipment modes and switching conditions between these three basic modes.

DESCRIPTION OF THE PREFERRED EMBODIMENTS

In the following, the management and packet indexing scheme for downloads are explained. This part is organized as follows: firstly, cell-grouping broadcast with traffic repetition is explained. By introducing the concept of download traffic classification, there is established the concept of download status and given the general idea to indicate the status of software downloads. Referring to the finished download probability in a single cell, an interworking between broadcast and dedicated resources is established to finalize the downloads for all involved terminals. With proposing a protocol for handling fragmented downloads, new information elements are introduced to be exchanged by network and terminals. Furthermore, a new terminal state (download state) is introduced, which complements the well-known idle and connected mode in e.g. 3GPP ($3^{rd}$ Generation Partnership Project). Several alternatives for the protocol design and the needed information elements are outlined.

Figure 1:
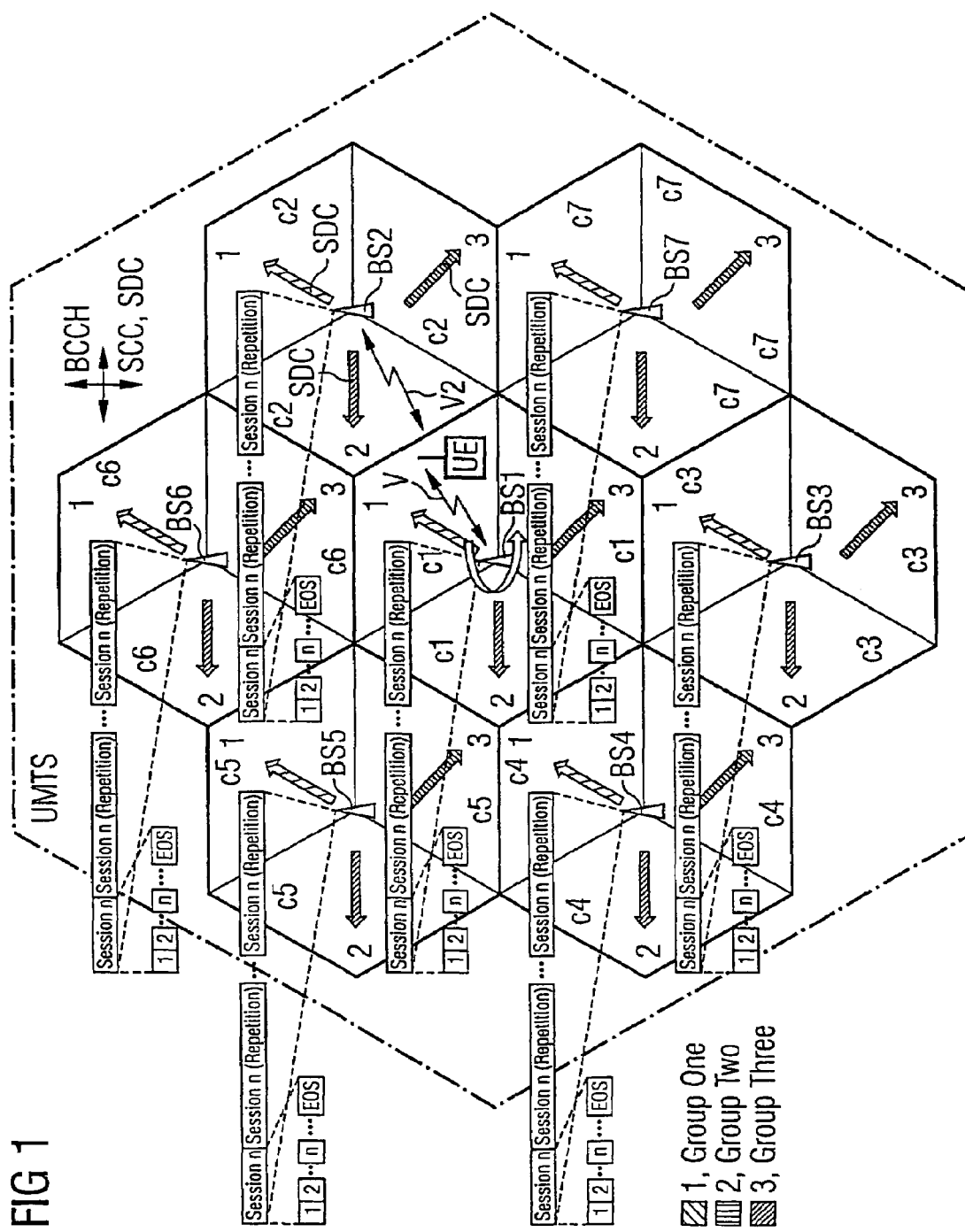
FIG. 1 shows an arrangement of communications system cells transmitting radio signals into sector cells in a circular cell grouping manner.

FIG. 1 shows a simple arrangement of a radio communications system comprising a plurality of cells c1, c2, ..., c7. Each cell c1, c2, ... c7 comprises a base station BS1, BS2, ..., BS7, in UMTS called node B. The base stations BS1 can communicate with mobile terminals, in UMTS called user equipment UE, or other stationary stations via radio links V. There are different types of radio links. Broadcast channels BCCH (Broadcast Control Channel) are used to provide a plurality of user equipments with the same data. Dedicated channels are used to build up a communication between the base station BS1 and one or more selected user equipments UE. Data can be transmitted in downlink, i.e. from base station BS1 to user equipment UE, or in uplink, i.e. from user equipment UE to base station BS1. According to the preferred embodiment the cells c1, c2, ..., c7 each are sectorized to provide three cell sectors 1, 2, 3.

An efficient cell download procedure can be organized in a circular manner, shown in FIG. 1. The downloaded software is repeatedly broadcast in each cell. FIG. 1 is a snapshot illustrating the periodic repetition. In a first step, download data, especially download software data, are sent into subcell sector 1. In a next time period the same data are sent into the subsector cells 2, and in a third time period the data are sent into the third subsector cell of one, two or more of the cells c1, c2, ..., c7.

In order to explain the approach more clearly, some terms are defined first. A service is a general term defined for the user equipment UE-network communication. The network UMTS offers a service to the user equipment UE, e.g. a broadcast service, a dedicated service, etc. A Session is a type of data, e.g. one software module, one news package, etc., which is broadcasted in the network. For each download session the session length can be defined. A packet is a fixed amount of data segmented from the session. Each packet has its own index number in a session. Data or information has to be understood without limitation and comprise every form of data and/or information which can be transmitted via a radio link. Data are especially information data, load data and control data/control signalling.

The download data can be classified into different classes according to the user profile characteristics. So, download traffic classification means to classify the software download traffic into a finite number of classes, e.g. upgraded software, driving news, stock market information, information from different service providers, etc. With the indication of software download termination shown in the following, the concept of software download status is defined. The status of software download shows the current download traffic class and if the download process is finished or in repetition/on-going status.

The reason to introduce a termination status is that a download session cannot always be repeated until a potential next session arrives. Due to nature of broadcast channels, a closed loop power control is not possible. The interference from the broadcast channel will highly influence the regular traffic. In case there is a certain small number of download users for a session, this session is not necessary to be transmitted over the broadcast channel any more. Using a braodcast channel creates much more interference than using only some dedicated channels being power controlled for software download.

FIG. 2 shows the design principle to choose a broadcast channel for downloads. As the user number increases, shown in X-axis in FIG. 2, the load created by the download traffic using dedicated channels increases exponentially. The load created by a broadcast channel is constant. The intersection point between these two curves is the threshold of choosing a broadcast channel or to carry out the downloads with dedicated channels. Therefore, the grey shaded right side of the intersection point is the area, where a broadcast channel should be selected for the download. The left side of the intersection point is the area, where dedicated channels should be used for downloads.

Therefore, a user equipment UE wishing to start a software download decides to request software download via a dedicated channel in case of high system load. On the other hand devices controlling base station BS1, BS2, . . . , BS7 provide these base stations with software data to be transmitted via broadcasting if system load or number of users is not below a threshold value which could be set depending on standard values or values considering regional conditions.

It is necessary or at least recommendable to introduce a third terminal state "download state" for user equipment UE as shown below. We assume the UMTS/FDD system (Universal Mobile Telecommunications Systems/Frequency Division Duplex) as one of the several systems of interest. An idle mode, a connected mode, and a download mode are accessed by the terminal software.

As shown in FIG. 3, starting from idle mode the download mode, especially software download mode listening to the broadcast channel is established as one further mode for the user equipment UE. It can be triggered by a detected download paging information 1 (download status information) carried by a control channel which will be introduced subsequently. Once the download is finished, the terminal changes back 2 to the idle mode. In the download mode, if a call is coming in, signalled by receiving radio resource control paging information 3 it is up to a Radio Resource Control (RRC) in the user equipment UE to interrupt temporarily the current download process and to switch to the connected mode 6. In case the connected mode is finished 4 and the download is still not finished, the UE should jump back to download mode 5.

If the download process through a broadcast channel is terminated according to principles shown in FIG. 2, a connected mode should be established 7 in order to finish the complete session as described later in more detail.

A software download control channel (SCC) periodically broadcasts the current status. If the current status indicates an on-going broadcast, the mobile user registered in this traffic class or willing to listen to this class will decode the software download data channel (SDC) and starts to download.

In addition, in order to have a higher probability to enhance the software download, a time shift between this control channel and the broadcast data channel should be also introduced.

Figure 4:
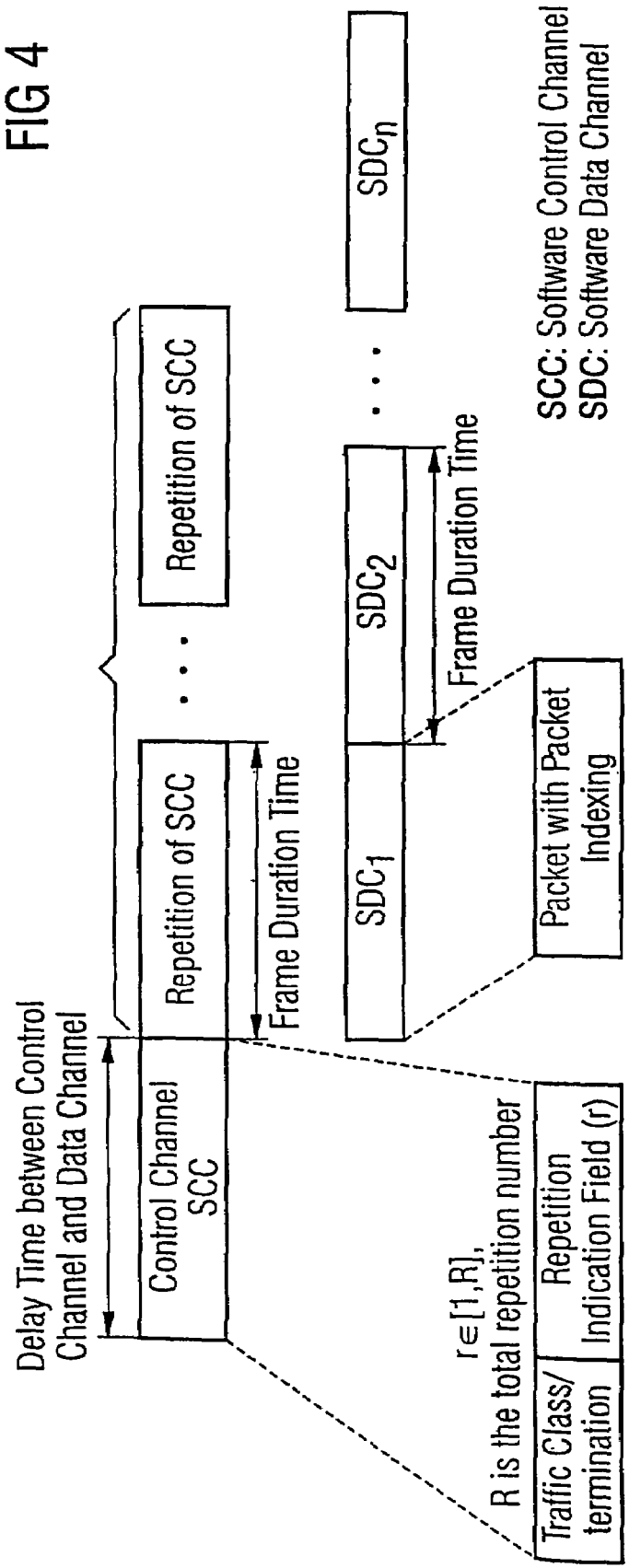
FIG. 4 shows a frame structure and relationship between data channel and control channel.

In FIG. 4, two types of channels are introduced, the software download control channel (SCC) and the software data channel (SDC). Via the control channel there are transmitted pieces, i.e. packets, of software download control information which are repeated several times. Each software download control information comprises data regarding traffic class/termination and a repetition indication field r, r=1, 2, . . . , R with R as the total repetition number. The data channel SDC starts later than the control channel SCC which indicates the current traffic class and repetition status. Data or data blocks transmitted via the data channel comprises packets with packet indexing, load data and maybe further information data.

The user equipment UE checks the control channel information periodically in order to save power. If it detects that the traffic class carried by control channel SCC is identical to its registered traffic class, it starts to download data via the data channel SDC.

In case the downloading services should be terminated, the status of downloading termination should be shown in software download control channel SCC, and the software data channel SDC should be released. The network triggers a termination signal by setting r=0.

A field named repetition indication field r is introduced after a traffic type field tr. The repetition indication field r carries the current repetition number r of the session. It indicates the detailed current status of software download. It starts from the total repetition number R decided by the download management in the network. When one iteration of the download session is finished, the value r decreases by one. The user equipment UE reads the r-value and estimates the amount of remaining packets which can be downloaded. The user equipment UE abandons the current reception, (1.:) if r equals to 1, (2.:) if still a number of packets have not been correctly received for the current session, and (3.:) if the missing packet number is smaller than the current packet index on the broadcast channel. The user equipment UE then switches to idle mode or connected mode immediately to save battery.

Figure 5:
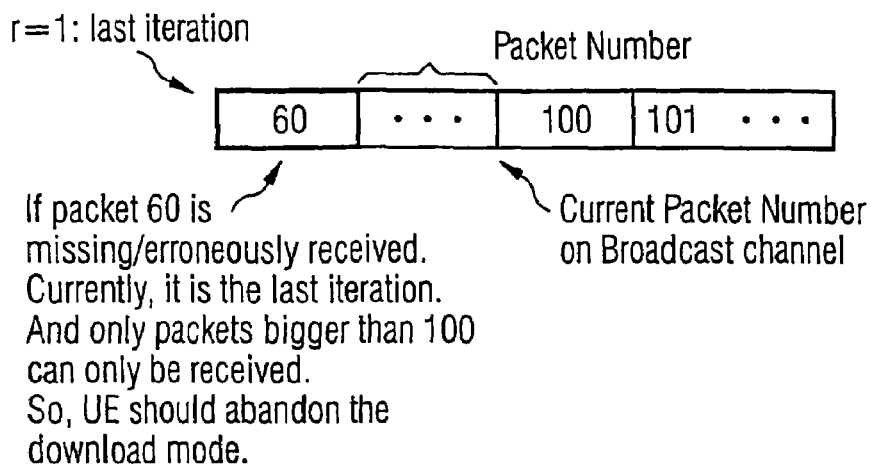
FIG. 5 shows a case in which the user equipment will leave download mode.

FIG. 5 illustrates this scenario. User equipment UE establishes that only a packet number 60 is missing or has been received corrupted and that the value of the repetition indication field r is 1, i.e. it is the last iteration step/last transmitting of this session by base station. If current packet number on broadcast channel is 100 then only packets having a packet number greater than 100 can be received. Therefore, user equipment UE could decide to abandon the download mode because there is no chance to receive missing or received corrupted packet with packet number 60.

Also, if the download was previously completed during an earlier repetition, the reception of the broadcast should be stopped. Further, user equipment UE and/or a controlling device on side of the base station BS1 like a radio network controller (RNC) can decide to stop software download via dedicated channel and to switch to broadcast channel, if number of users or system load exceed the said threshold value, e.g. intersection point of FIG. 2.

Furthermore, user equipment UE can decide to stop software download from the broadcasting channel in the case that the user equipment UE moves from a first cell c1 to a second cell c2, thereby leaving the coverage area of base station BS1 of first cell c1. After handover to base station BS2 of second cell c2 user equipment UE can resume software download via radio link V2 to base station BS2 of the second cell c2. This radio link V2 can be either a broadcast channel or a dedicated channel. The same holds for a change of user equipment UE from radio reach of first subsector 1 of a cell c1 to a second subsector 2 of the same cell c1.

Figure 6:
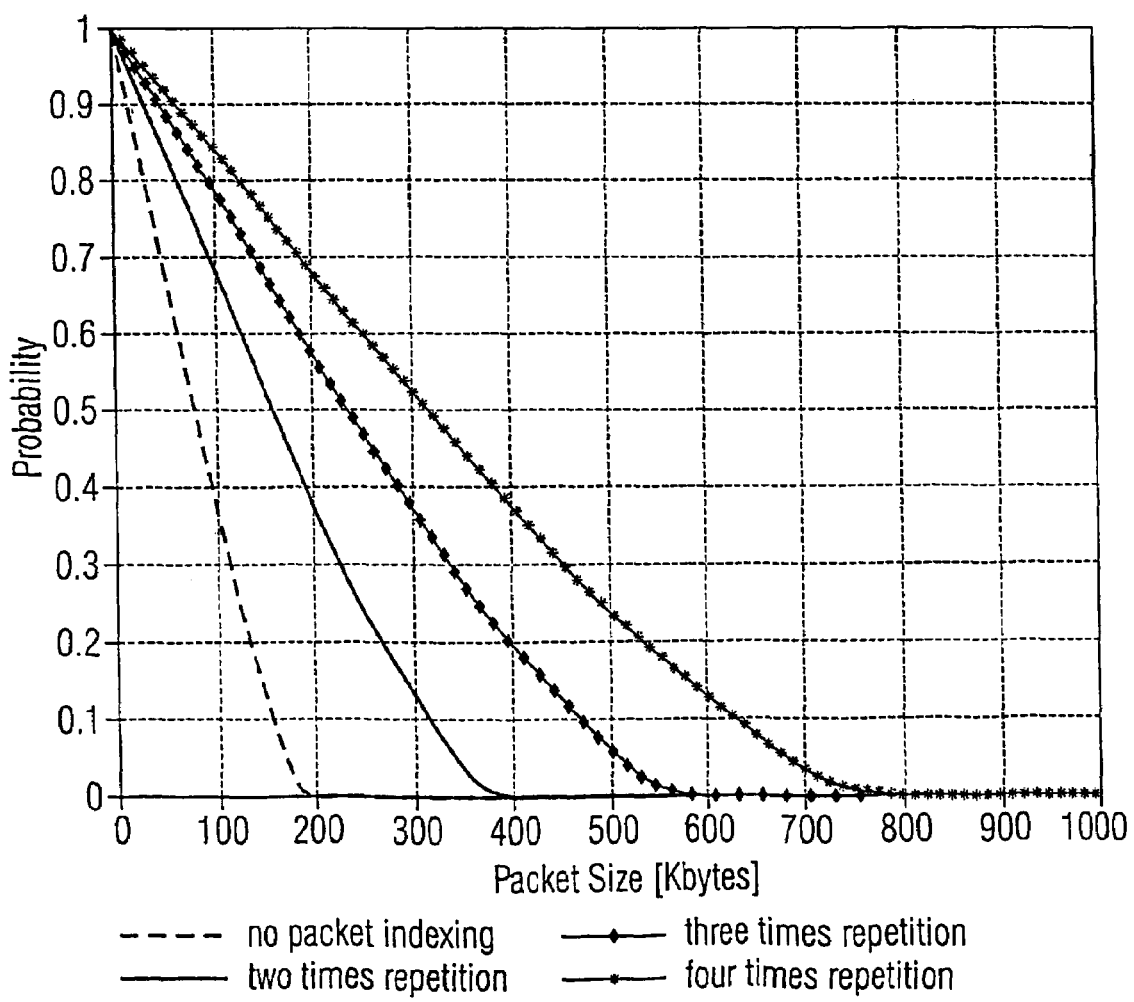
FIG. 6 shows a performance comparison between a packet indexing and no packet indexing.

In order to support the mechanism of software download repetition, an indexing scheme is introduced according to the preferred embodiment. A no packet indexing case is identical to a single cell and no download repetition scenario. In order to compare the software download performance enhanced by the packet-indexing scheme, a simulation comparing the performance without packet indexing and the case with packet indexing has been arranged. On an upper bound it is assumed that the segmentation is sufficiently small to support seamless handover. However, performance is only one aspect of the system performance, so the download process cannot be always repeated. The so called party effect well known from code division multiplex access (CDMA) behaviour caused by a longer time download process and the real time requirement for the waiting download traffic cannot allow the unlimited repetition of the download. The following part illustrates that the success rate for completed downloads is increased when repeating the broadcasts. As already mentioned this leads to fragmented downloads in terminals, and with the procedures introduced in this application more finished downloads are accomplished, as can be seen from FIG. 6.

Figure 7:
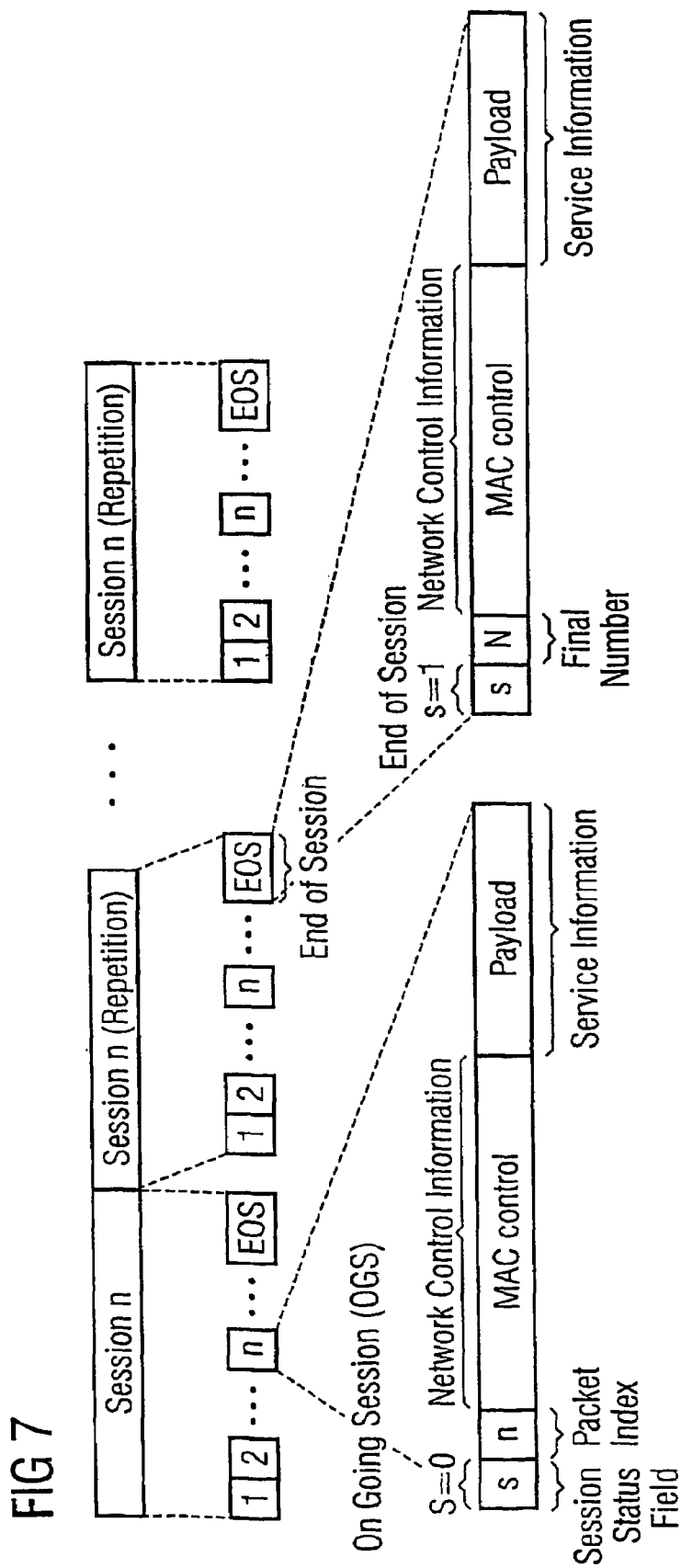
FIG. 7 shows session, packet and service relationships.

A frame structure containing the session and packet index is shown in FIG. 1 and FIG. 7. The software download control channel SDC carries the packet indexes, session indexes, session status field, medium access control information and the download data, where the packet index and session index are of major interest. Download data are the payload comprising software data to be downloaded as service information. The pieces of medium access control (MAC) information are network control information. The session status field s comprises a first value s=0 representing an on-going session (OGS) or a second value s=1 representing end of session EOS. Packet index n is running up to a final number N.

In the download procedure, if the user stays in the cell c1 without leaving the serving cell in the download phase, it will finish the download successfully if we assume the link quality to be good enough. However, the investigation of finished download probability with respect to the data size, vehicular speed and broadcast channel capacity shows that handovers to other channels or cells c2 during the download phase must be taken into account and fragmentation will occur. The fragmented downloads in terminals can be finalized by introducing a packet index and other information elements e.g. the repetition indication field r combined with a suitable protocol.

The user equipment UE keeps receiving the download session while checking the received packet index n and reassembles the order of packets with respect to the received indexes. If the number of received packets is the same as the number indicated in the final packet labeled by the EOS signal in the session status field (s=1), the whole sequence of the packets in the current session is successfully downloaded. In FIG. 7, the on-going session index OGS (s=0) shows the current received packet is on-going session broadcast; the EOS signal shows the end of session.

Figure 8:
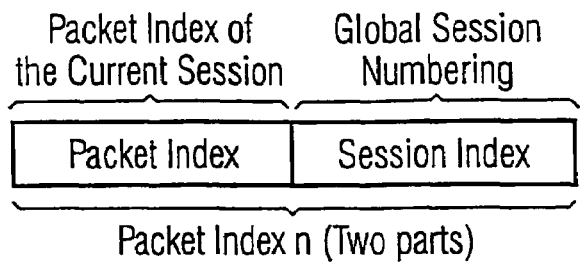
FIG. 8 shows a structure of a packet indexing scheme for labeling download sessions.

The packet index n is a number composed of hierarchical two-level codes, a local packet index and a global session number as depicted in FIG. 8.

The on-going session OGS and end of session EOS signal helps the user equipment UE to judge whether it has successfully downloaded the current session. The session status fields need only one bit. Another alternative way of indicating the end of the session is to broadcast the total number N of packets for the current download session in the low data rate control channel, i.e. in the software control channel SCC.

The number as shown in FIG. 8 can be seen as the absolute packet index n comprising the packet index of the current session and the session index of a global session numbering. The reason to have an absolute packet index n is to avoid overlaps if two packets with the same relative packet number but belonging to different sessions are received. The protocol stacks in the Radio Network Controller (RNC) and the user equipment UE must support this approach. A new logical channel called software data channel (SDC) should be established in the radio access network in order to handle the download traffic for addressing many users. For instance, a third common physical channel could be established in UMTS/FDD to carry this logical channel.

Figure 9:
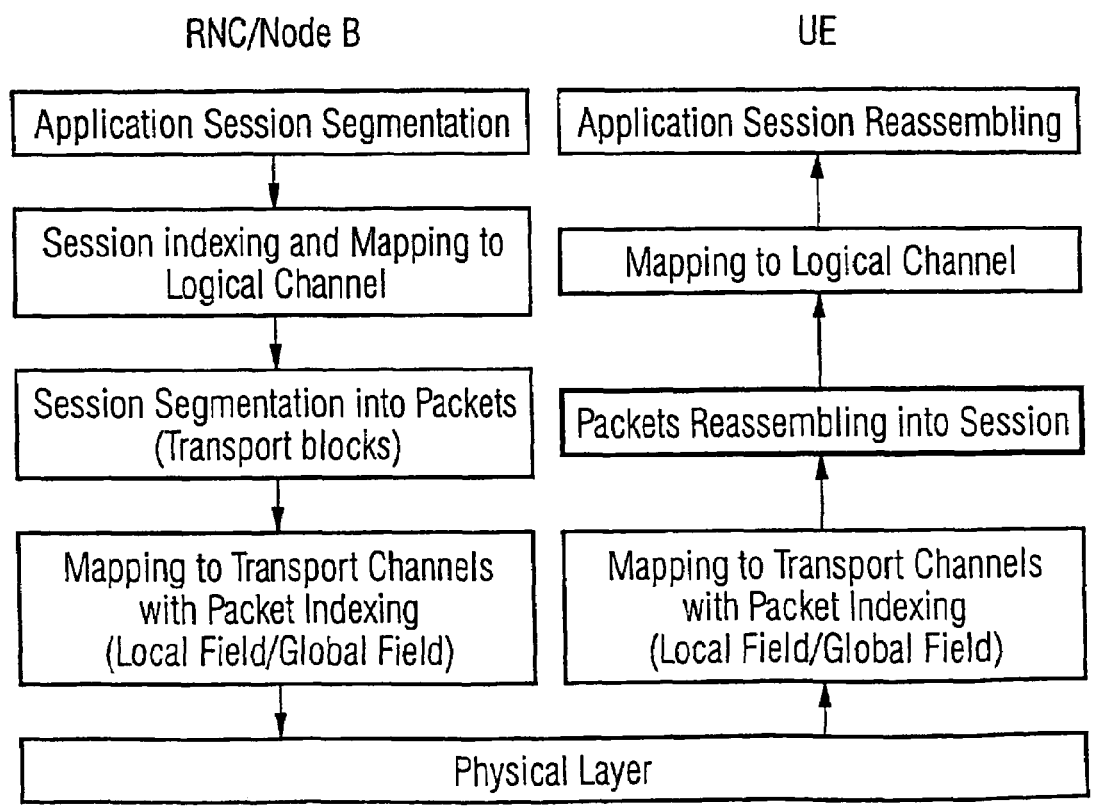
FIG. 9 shows protocol stacks in a radio network controller and in a user equipment.

As shown in FIG. 9, the Radio network controller (RNC) and optional the base station BSi/node B has the responsibility to organize the labeling for download traffic. With respect to the physical layer radio network controller RNC and/or base station (node B) starts with application of session segmentation. Thereafter, a session indexing and mapping to logical channel follows. After this session segmentation into packets, e.g. into transport blocks, as provided. After this mapping to transport channels with packet indexing comprising a local field and a global field is provided to transport data via the physical layer.

The user equipment UE reassembles the received packets into a complete session. User equipment UE provides a mapping to transport channels with packet indexing comprising the local field and the global field with respect to the physical layer. Thereafter, a packets reassembling into session follows. This block in FIG. 9 is an important point of one aspect of the invention according to a preferred embodiment, which enables the user equipment UE to complete the broadcast information. Thereafter, a mapping to logical channel has to follow. After this an application of session reassembling has to be provided.

In case the download phase by means of repetition is finished and the user equipment UE has not completed the download, he should apply for a dedicated radio resource. The download session can be received during different cell affiliations, i.e., due to handover. During the lifetime of a broadcast session, fragments of the session are received.

Figure 10:
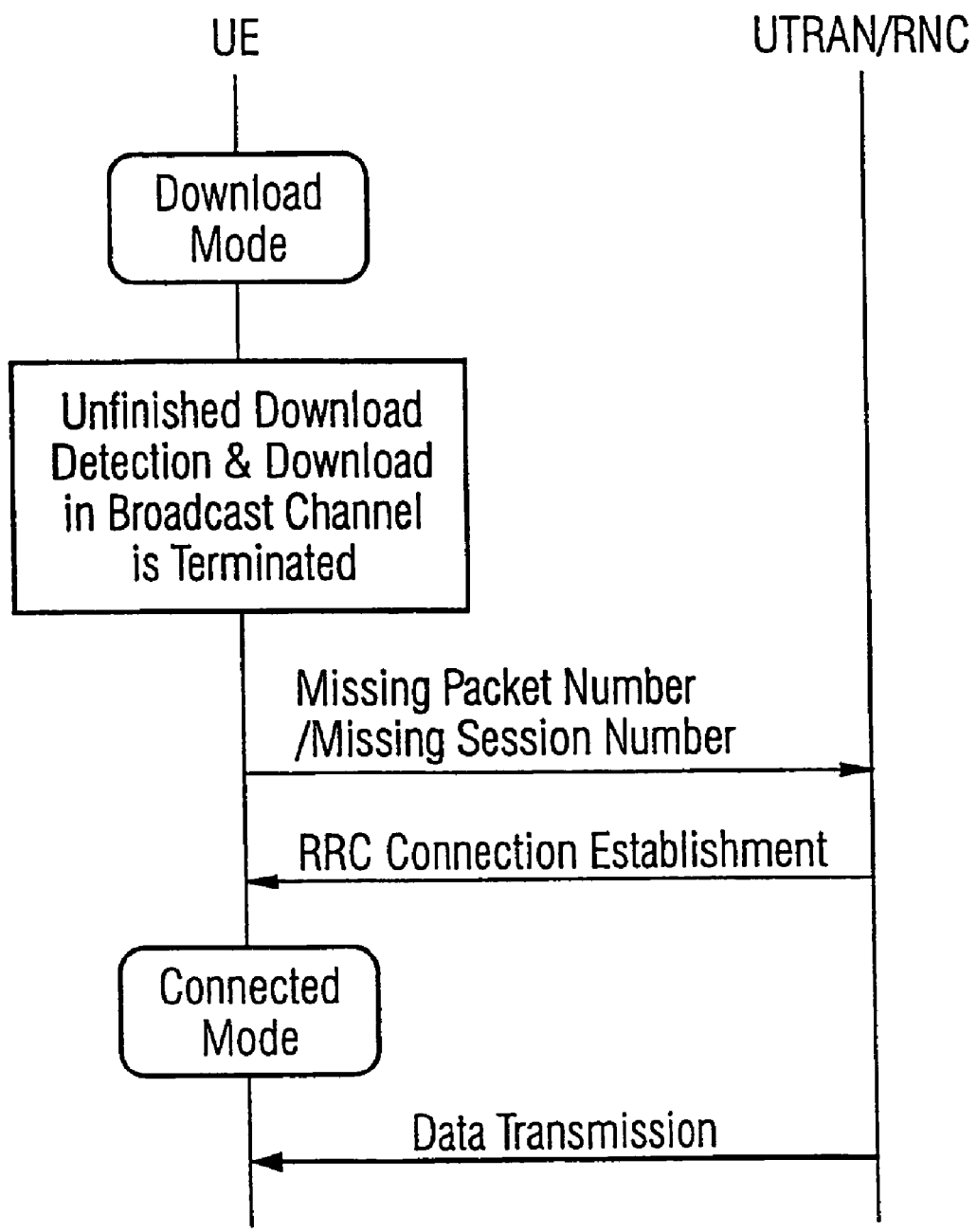
FIG. 10 shows a timing table for jumping from download mode to a connected mode.

A simplified mobile switching center (MSC) chart between the user equipment UE and network in case the mode jumps from download mode to the connected mode is shown in FIG. 10.

Starting from download mode the user equipment UE detects an unfinished download after download in the broadcast channel has been terminated. Therefore, user equipment UE sends the missing packet index n comprising packet index number of the current session and the session number of global session numbering to the radio network controller RNC of the communicating network (e.g. UTRAN: UMTS Terrestrial Radio Access Network). Network devices like the radio network controller establish a radio resource control (RRC) connection, e.g. dedicated link between a base station BS1 and user equipment UE. Thereafter, user equipment UE switches to connected mode in order to receive missing software data via data transmission via the dedicated channel.

Alternative 1:

The terminologies introduced previously is only to build up the concept of software download using a packet indexing scheme. The similar functionality can be realized by upgrading available control channels, e.g. forward access channels (FACH) indicated by the broadcast control channel (BCCH). There are many alternative ways to fulfill the requirement of software download. E.g. the user equipment UE can determine that the session is finished by observing the event when the repetition field r is decreased by one. In this case, the end of session EOS and on-going session OGS signalling are not needed. However, the probability of successful judgment of finished downloads is lower.

Figure 11:
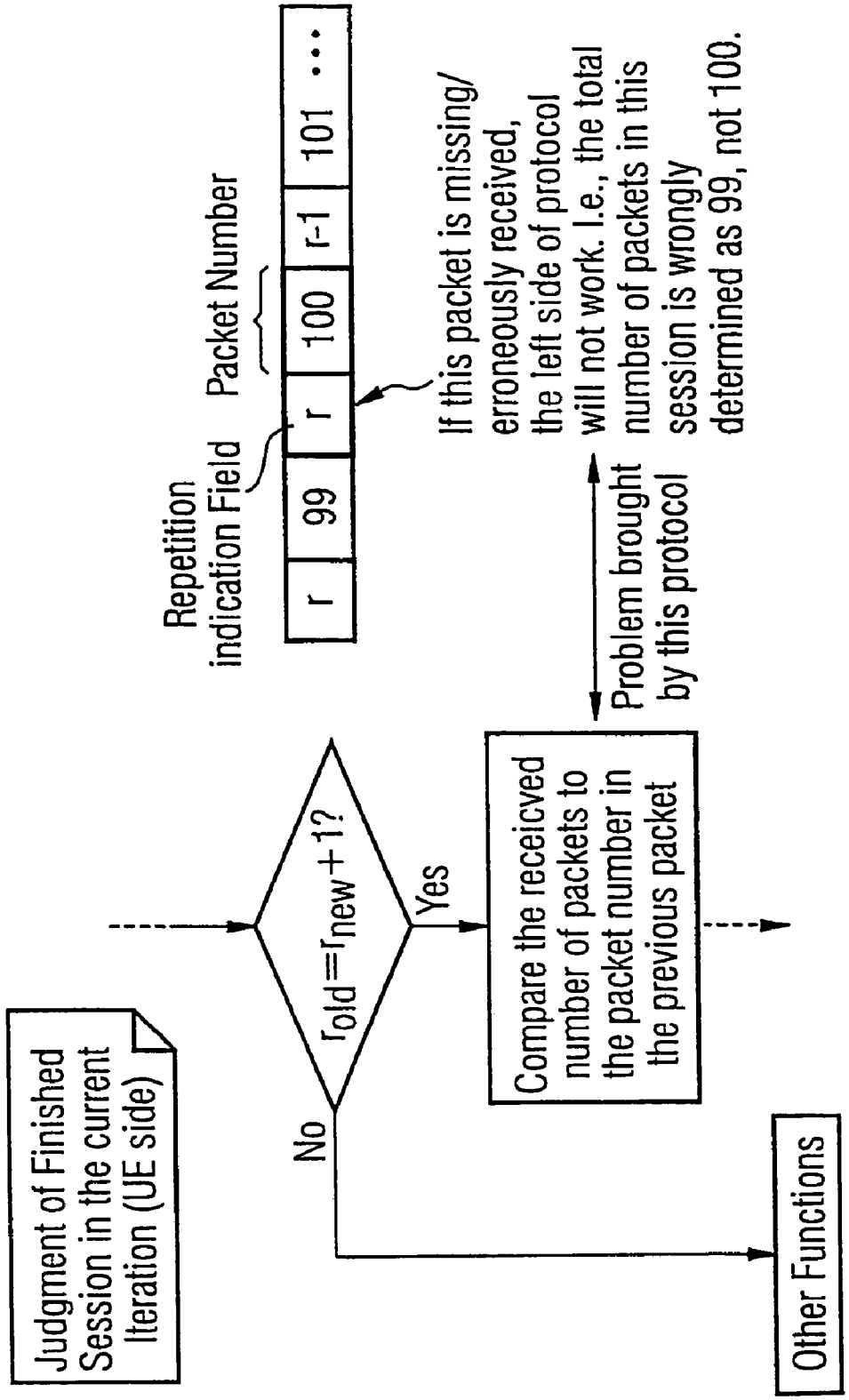
FIG. 11 shows a worst case scenario of an alternative solution of judging the end of session.

The following FIG. 11 shows the worst case scenario when an error occurs. The user equipment UE judges whether or not a session in the current iteration is finished by comparing Whether or not $r_{old}$ is equal to $r_{new}+1$. If not, other functions will be executed. If yes, the user equipment compares the received number of packets to the packet number in the previous packet. If for example packet number 100 is missing or received corrupted, the comparing step of the protocol will not work. As a consequence, the total number of packets in this session will be wrongly determined as 99, not 100.

The most important information should be carried out by the air interface. The packet-indexing scheme can be realized alternatively. There are still number of alternative means to inform the user equipment UE how many packets the session has, e.g.:

Alternative 2:

The total packet number N can be broadcasted by the periodic software download control channel SCC. In this case the session status fields are not needed. However, software download channel SDC cannot work independently from the software download control channel SCC.

Alternative 3:

The total packet number N can be carried in each transport block in the software download control channel SDC. In this case it looses spectrum efficiency, if maximum number N of repetitions is large.

Features of the invention, which might present independent inventive aspects, are discussed in the following:

a. A first inventive aspect is the introduction of download session repetition using common channels, e.g. broadcast. The packet indexing scheme enhances its performance. It mainly resolves the unfinished download problem due to handover and radio bearer service selection.

In case the user equipment UE changes its affiliation from a base station BS1 in a first cell c1 to a base station BS2 of another cell c2 where both cells c1 and c2 are repeatedly broadcasting the download stream, the user equipment UE can selectively receive the missing part of a session.

In case the bearer service has been changed for the user equipment UE, e.g. due to interference reason, in case when the download channel is changed from broadcast channel to dedicated channel, the user equipment UE still can apply for the missing packets to complete the unfinished download. A table of missing packet is sent to the network after the broadcast session.

Furthermore, in a multi-download service type scenario, i.e., when different cells are broadcasting different sessions, user equipment UE can select the right session thanks to the session differentiation enhanced by session index.

One realization of combining the session status field and packet index is introduced. It brings the advantage of increasing probability of correctly decoding the whole packet number for a download session, as shown in FIG. 11.

b. According to a second inventive aspect there is introduced a frame structure for the software download channels, i.e. software download control channel (SCC) in parallel with data channel (SDC) as shown in FIG. 4, where the session repetition indication field r carries the current repetition number inexplicitly showing how many repetitions are left. Based on this value, the user equipment UE abandons the software download mode, if there is no chance to finish the download via common channels.

c. according to a third inventive aspect a new download terminal state (mode) is introduced whereby the following advantages are evident:

Interworking between control information and the data channel broadcast with a time shift (delay time) to increase the finished download probability.

Terminal based decision to abandon the download state, if already successfully completed the download or if no further chance exist to complete by broadcast session.

d. A further important feature is based on c. As shown in FIG. 10, in case the user equipment UE switches from download mode to connected mode during its download process, it should submit the missing packet numbers and related session number in the reverse link to the network.

e. Since the packet indexing approach can be independently implemented in different cells, it can be also independently implemented with respect to the cell grouping approach. The idea if introducing the control information telling the current download status in order to page the software download user equipment UE is not only limited in the UMTS/FDD system. In any system where especially the push service is employed it can be implemented.

We claim:

1. A method for downloading data in a radio communications system, the system including at least one base station with means for transmitting data to receiving stations via communication links, the method which comprises:

dividing data into a plurality of data packets;

transmitting the data packets via a first communication link to at least one receiving station using a broadcast channel;

halting a download of the data packets upon determining that a data packet has not been received or that a corrupted data packet has been received by the receiving station; and retransmitting the non-received or corrupted data packet via a different, second communication link at a later time using an established dedicated channel.

2. The method according to claim 1, which comprises repeatedly retransmitting the non-received or corrupted data packet via the second communication link.

3. The method according to claim 1, which comprises marking each of a plurality of data packets assigned to a session with a session index.

4. The method according to claim 3, which comprises assigning a packet index to each of the data packets of a session, the packet index including the session index and an individual packet number.

5. The method according to claim 1, which comprises selectively halting and continuing the download of the data packets depending on a determined system load or a number of receiving stations communicating with the base station.

6. The method according to claim 1, which comprises signaling at least one of an end of session command and a number of further retransmissions of the sessions to the receiving station.

7. The method according to claim 1, wherein the data is software data for adapting or modifying software of the receiving station.

8. The method according to claim 1, which comprises using a broadcast channel with a reduced transmission power for transmitting the data.

9. The method according to claim 1, which comprises changing an affiliation of a user equipment, forming the receiving station, from a first base station to a second base station and selectively receiving a missing part of a session from the base stations repeatedly broadcasting a download stream.

10. The method according to claim 1, which comprises, in case a bearer service is changed or the download channel is changed from a broadcast channel to a dedicated channel, requesting the non-received or corrupted data packet with the receiving station by signaling a table of missing packets to the base station.

11. The method according to claim 1, which comprises, in a multi-download-service scenario with multiple cells each broadcasting a different session, selecting with the receiving station a session by way of a session index.

12. A radio communication system, comprising at least one base station and at least one receiving station each having means for carrying out the method according to claim 1.

13. A method for downloading data in a radio communications system, the system including at least one base station with means for transmitting data to receiving stations via communication link, the method which comprises:

dividing data into a plurality of data packets;

transmitting the data packets via the communication link to at least one receiving station;

halting a download of the data packets upon determining that a data packet has not been received or that a corrupted data packet has been received by the receiving station;

retransmitting the non-received or corrupted data packet via the same or a different communication link at a later time;

selectively halting and continuing the download of the data packets depending on a determined system load or a number of receiving stations communicating with the base station; and using a broadcast link to continue the download of data packets if the system load or the number of receiving stations exceed a predetermined threshold, whereas, if the system load or the number of receiving stations lies below the predetermined threshold, using at least one dedicated channel.

* * * * *